US012152748B2

(12) United States Patent
Jun

(10) Patent No.: US 12,152,748 B2

(45) Date of Patent: Nov. 26, 2024

(54) VEHICLE LAMP

(71) Applicant: HYUNDAI MOBIS CO., LTD., Seoul (KR)

(72) Inventor: Young Geun Jun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/448,247

(22) Filed: Aug. 11, 2023

(65) Prior Publication Data

US 2024/0175561 A1 May 30, 2024

(30) Foreign Application Priority Data

Nov. 30, 2022 (KR) ........................ 10-2022-0164965

(51) Int. Cl.

*F21S 41/265* (2018.01)
*F21S 41/143* (2018.01)
(Continued)

(52) U.S. Cl.

CPC ........... *F21S 41/265* (2018.01); *F21S 41/143* (2018.01); *F21S 41/151* (2018.01); *F21S 41/321* (2018.01)

(58) Field of Classification Search

CPC ...... F21S 41/265; F21S 41/143; F21S 41/151; F21S 41/321; F21S 41/338; F21S 41/323; F21S 41/322; F21S 41/30; F21S 41/33; F21S 41/26; F21S 41/27; F21S 41/285; F21V 7/0083; F21V 7/048; F21V 7/06; F21V 7/07; F21V 7/08; F21V 7/09; F21W 2103/00; F21W 2103/55; F21W 2107/00;

(Continued)

(56) References Cited

U.S. PATENT DOCUMENTS

| | | | | |
|---|---|---|---|---|
| 7,168,836 B2 * | 1/2007 | Tatsukawa | ............ | F21S 41/155 362/328 |
| 2014/0092619 A1 * | 4/2014 | Bushre | .................... | F21S 41/40 362/520 |

(Continued)

FOREIGN PATENT DOCUMENTS

| | | | | |
|---|---|---|---|---|
| DE | 202020105338 U1 * | 11/2020 | ............. | F21S 41/10 |
| KR | 20180078951 A * | 7/2018 | | |

OTHER PUBLICATIONS

Search English translation of KR 20180078951 A (Year: 2018).*
Search English translation of DE-202020105338-U1 (Year: 2020).*

*Primary Examiner* — Omar Rojas Cadima
(74) *Attorney, Agent, or Firm* — NovoTechIP International PLLC

(57) ABSTRACT

The present disclosure relates to a vehicle lamp, and the vehicle lamp includes a light source part including a plurality of light sources that irradiate a light beam, an output lens part that outputs the light beam irradiated from the light source part in an output direction that is a forward direction to form a predetermined beam pattern and including an input surface into which the light beam irradiated from the light source part is input and an output surface from which the light beam passing through the input surface is output, and a reflector that reflects the light beam irradiated from the light source part and inputs the reflected light beam into the input surface to form the beam pattern, wherein the light beam emitted from the light source part is condensed by the reflector and input into the input surface.

10 Claims, 6 Drawing Sheets

(51) Int. Cl.
*F21S 41/151* (2018.01)
*F21S 41/32* (2018.01)

(58) Field of Classification Search
CPC ......... F21W 2102/135; F21W 2102/19; B60Q 2400/30; B60Q 1/0035; B60Q 1/0041; B60Q 1/18
See application file for complete search history.

(56) References Cited

U.S. PATENT DOCUMENTS

2017/0241605 A1* 8/2017 Yamamoto ............ F21S 41/338
2019/0154222 A1* 5/2019 Iwasaki ................. F21S 41/663

* cited by examiner

VEHICLE LAMP

CROSS-REFERENCE TO RELATED APPLICATIONS

This application claims the benefit of priority to Korean Patent Application No. 10-2022-0164965, filed in the Korean Intellectual Property Office on Nov. 30, 2022, the entire contents of which are incorporated herein by reference.

TECHNICAL FIELD

The present disclosure relates to a vehicle lamp.

BACKGROUND

Head lamps play an important role for safe traveling by forming a low beam pattern or a high beam pattern to secure forward vision of a driver during night traveling. In recent years, as the head lamps have gradually been slimmed, wide and slim lenses are also used as adaptive driving beam (ADB) lamps that prevent glare to a driver of a preceding vehicle.

In general, a projection-type optical system that implements the ADB lamp includes a combination of a primary optical system that condenses and distributes a light beam near a focal point and a secondary optical system such as a projection lens.

However, in a conventional structure in which the primary optical system and the projection lens are combined, since optical efficiency is sharply degraded in a slim design in which a height of a lens is small, optical performance required for the ADB lamp is not satisfied, and implementation of a required beam pattern is difficult.

Thus, an optical structure is required which may implement a slim high beam pattern that is long in a left-right direction and short in an up-down direction even when the height of the lens is low.

SUMMARY

The present disclosure has been made to solve the above-mentioned problems occurring in the prior art while advantages achieved by the prior art are maintained intact.

An aspect of the present disclosure provides a vehicle lamp that minimizes light loss, satisfies optical performance, and at the same time, implements a slim design.

Another aspect of the present disclosure provides a vehicle lamp having improved productivity and reduced material costs.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle lamp includes a light source part including a plurality of light sources that irradiate a light beam, an output lens part that outputs the light beam irradiated from the light source part in an output direction that is a forward direction to form a predetermined beam pattern and including an input surface into which the light beam irradiated from the light source part is input and an output surface from which the light beam passing through the input surface is output, and a reflector that reflects the light beam irradiated from the light source part and inputs the reflected light beam into the input surface to form the beam pattern, wherein the light beam emitted from the light source part is condensed by the reflector and input into the input surface, and a light path of the light beam passing through the output lens part in a left-right direction is formed due to optical characteristics of the input surface, and a light path of the light beam passing through the output lens part in an upward/downward direction is formed due to optical characteristics of the output surface.

The reflector may include a plurality of reflective modules spaced apart from each other in the left-right direction, and the plurality of reflective modules may include a plurality of reflective surfaces corresponding to the plurality of light sources, respectively.

A vertical cross section of the reflective surface may be formed toward the output direction as it goes downward and formed in a concave curved surface toward a light source direction that is opposite to the output direction.

A vertical focal point of the reflective surface may be positioned closer to the input surface than a midpoint between the reflective surface and the input surface.

A horizontal cross section of the reflective surface may be formed in a parabolic shape convex in a light source direction that is opposite to the output direction.

Curvatures of the reflective surfaces included in the different reflective modules on the horizontal cross section may be different from each other.

Curvatures of the plurality of reflective surfaces on the horizontal cross section may be different from each other.

The input surface may include a plurality of unit light input surfaces arranged in the left-right direction and corresponding to the plurality of reflective modules, respectively.

The plurality of unit light input surfaces may be arranged to correspond to traveling paths of the light beams reflected by the plurality of reflective modules, respectively.

A horizontal cross section of the unit light input surface may be formed in a curved surface shape convex toward a light source direction that is opposite to the output direction and formed toward the output direction as it goes to an end thereof in the left-right direction.

The output surface may be continuously formed in the left-right direction and formed in an area corresponding to an area including the plurality of unit light input surfaces.

A horizontal cross section of the output surface may be formed in a convex shape in the output direction and formed toward a light source direction that is opposite to the output direction as it goes one end thereof in the left-right direction.

A vertical cross section of the output surface may be formed in a convex shape in the output direction.

BRIEF DESCRIPTION OF THE DRAWINGS

The above and other objects, features and advantages of the present disclosure will be more apparent from the following detailed description taken in conjunction with the accompanying drawings:

FIG. 1 is viewed from one side;

DETAILED DESCRIPTION

Hereinafter, embodiments of the present disclosure will be described in detail with reference to the accompanying drawings.

First, the embodiments described below are embodiments suitable for understanding technical features of a vehicle lamp according to the present disclosure. However, the present disclosure is not limited to the embodiments described below, the technical features of the present disclosure are not limited by the described embodiments, and various modifications may be made within the technical scope of the present disclosure.

Figure 1:
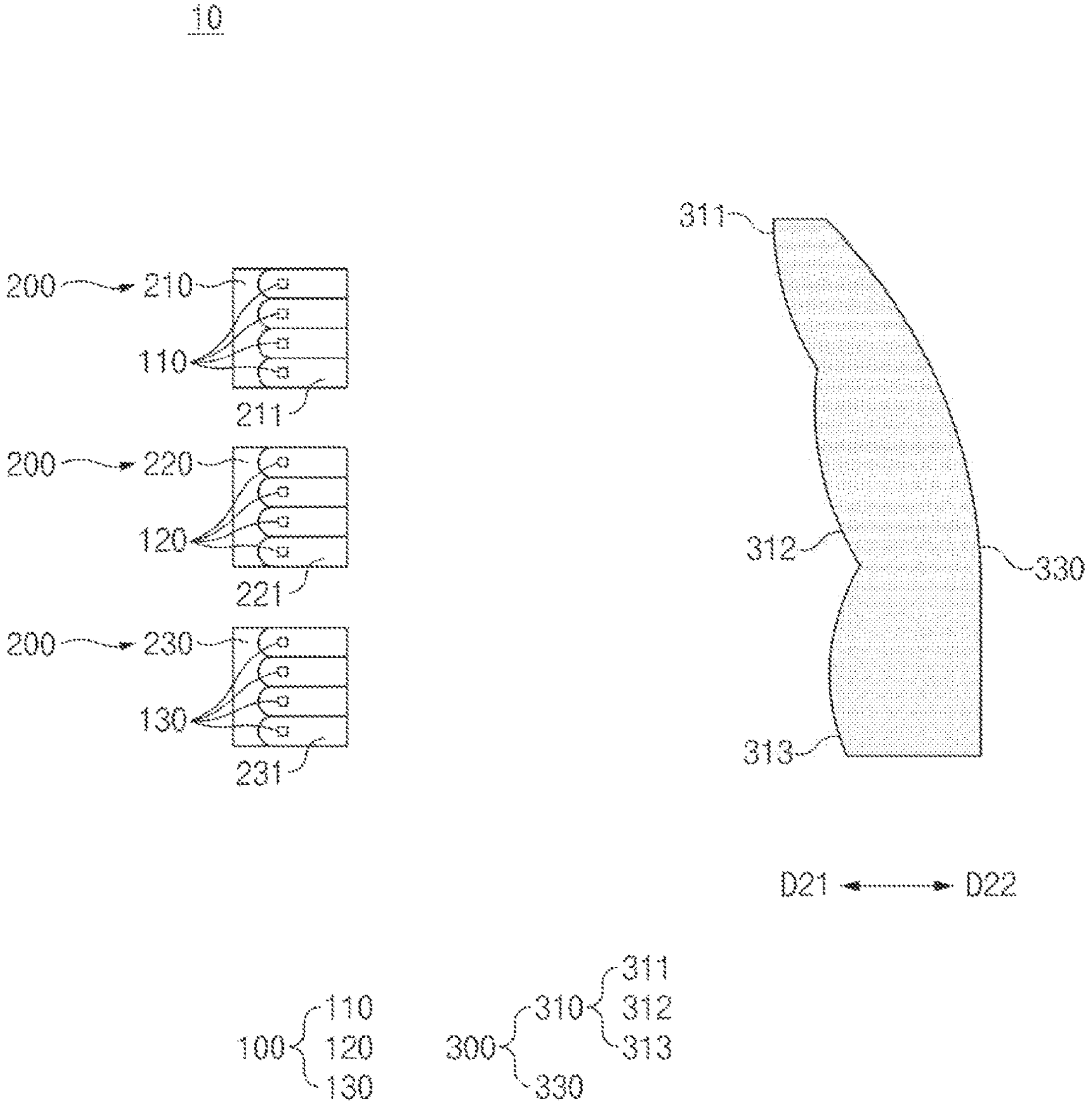
FIG. 1 is a schematic top view illustrating a configuration of a vehicle lamp according to an embodiment of the present disclosure.
Figure 2:
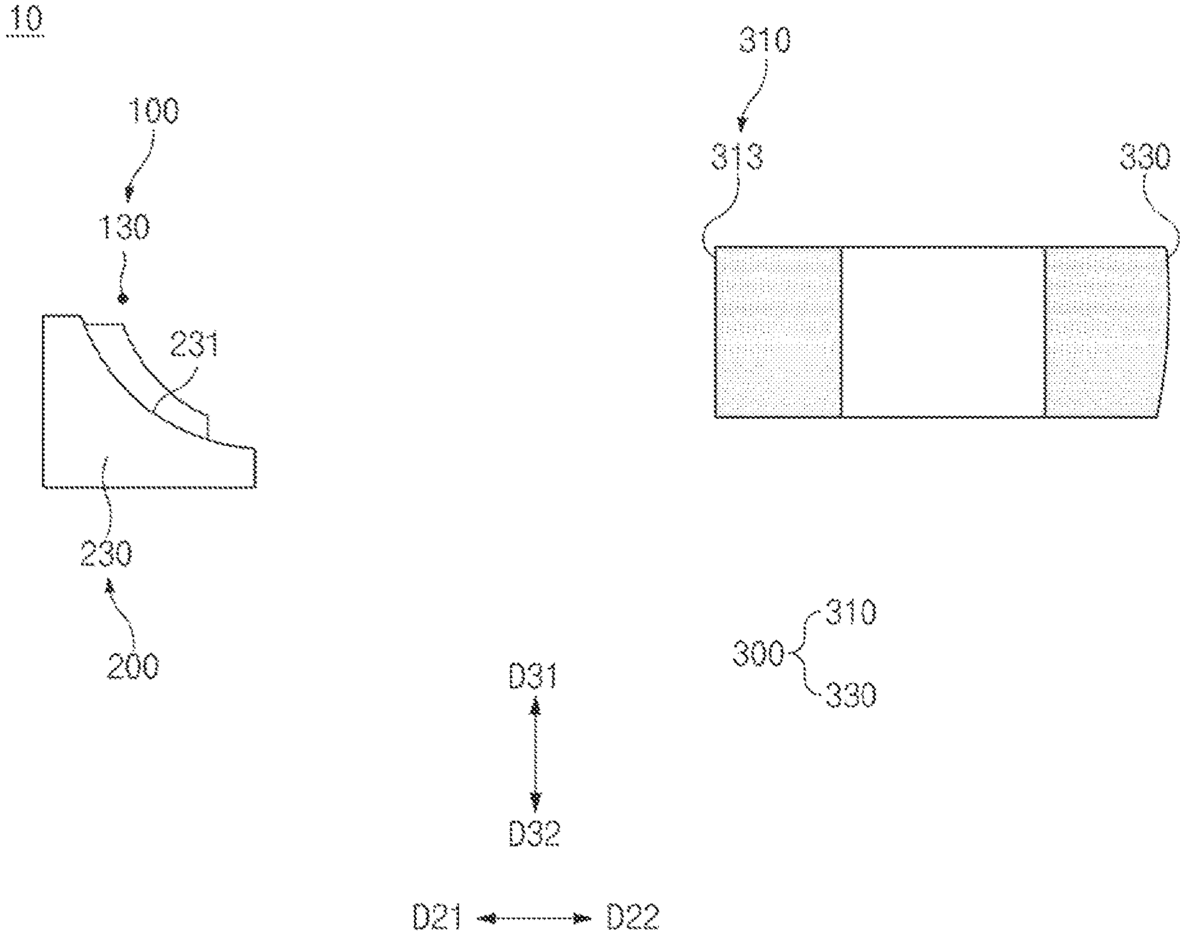
FIG. 2 is a schematic view illustrating a configuration of a vehicle lamp according to the embodiment of the present disclosure when
Figure 3:
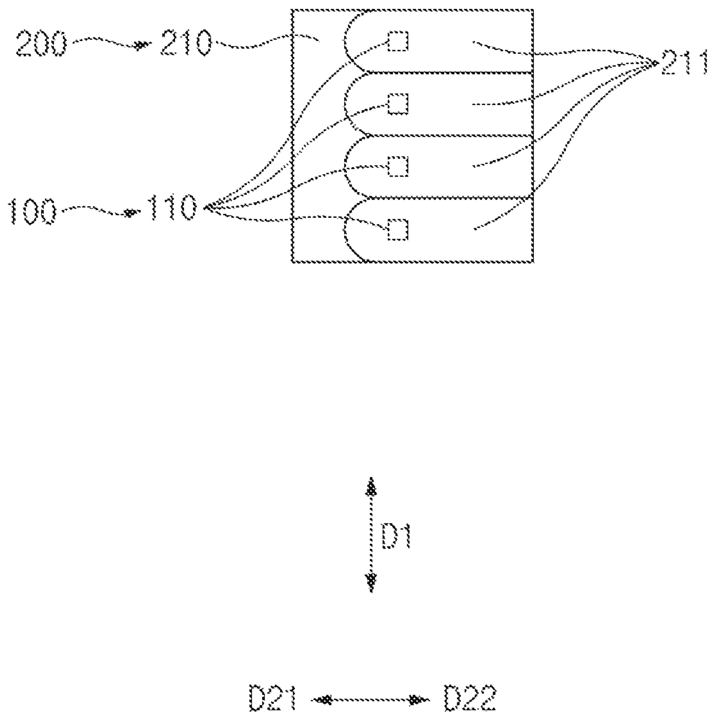
FIG. 3 is an enlarged view of a first reflective module illustrated in FIG. 1.
Figure 4:
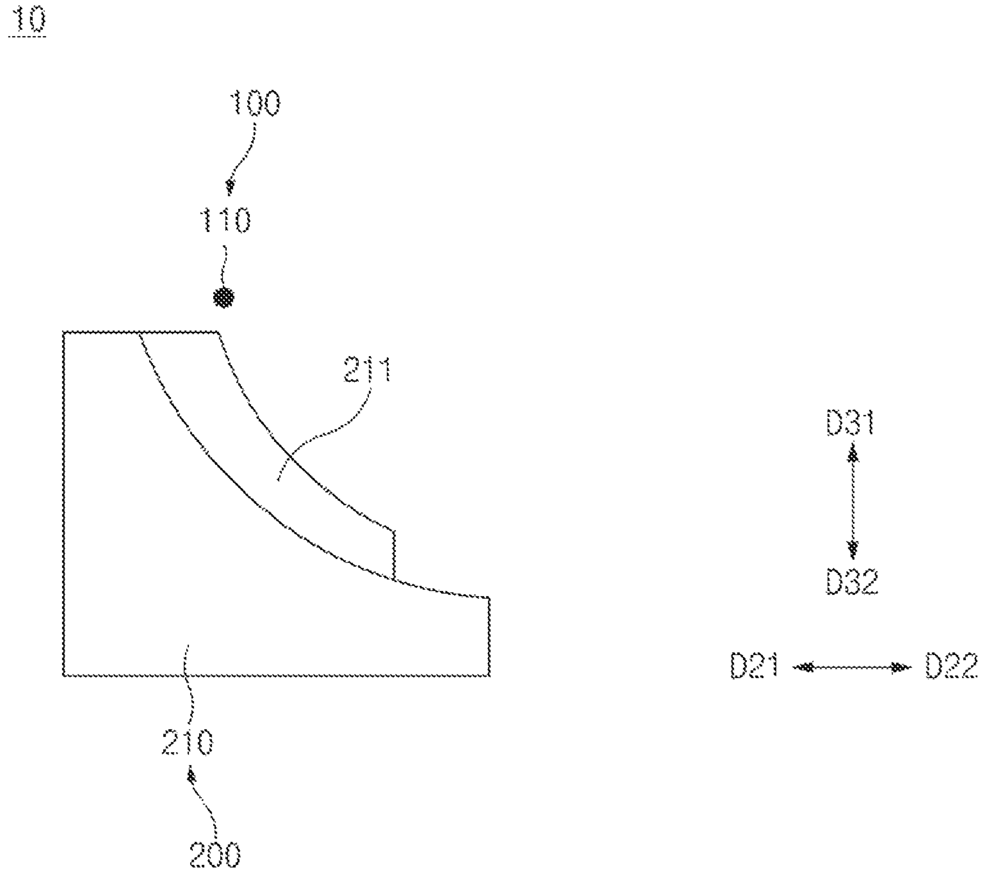
FIG. 4 is a vertical cross-sectional view of the first reflective module illustrated in FIG. 3.
Figure 5:
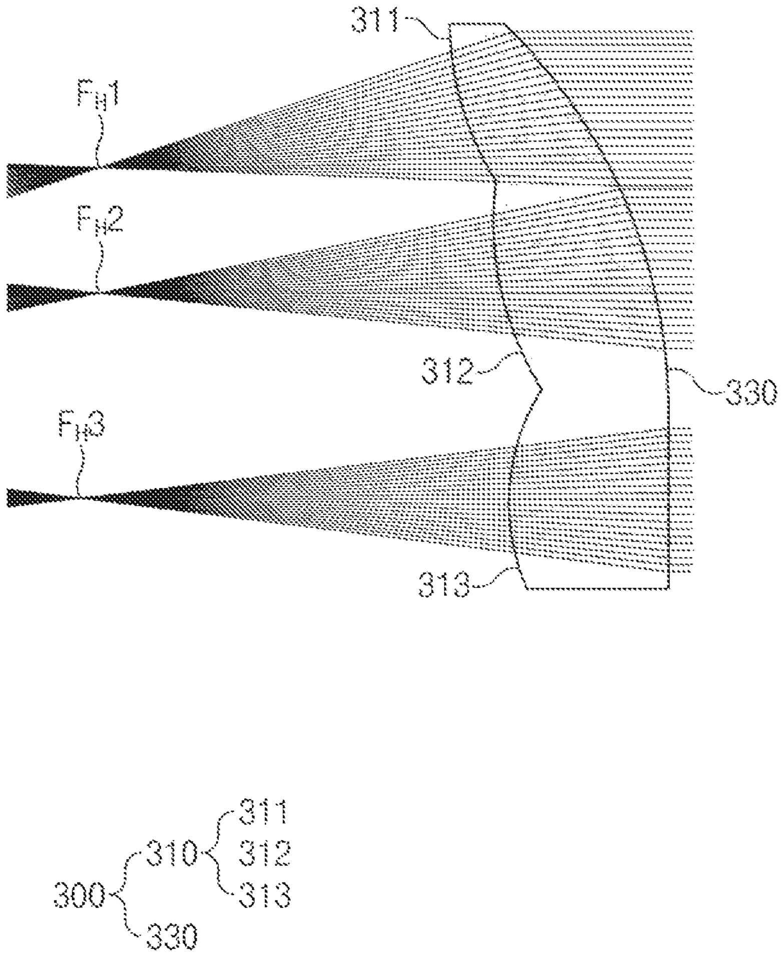
FIG. 5 is a view for describing optical characteristics of an output lens part when a light path by the output lens part is viewed from above.
Figure 6:
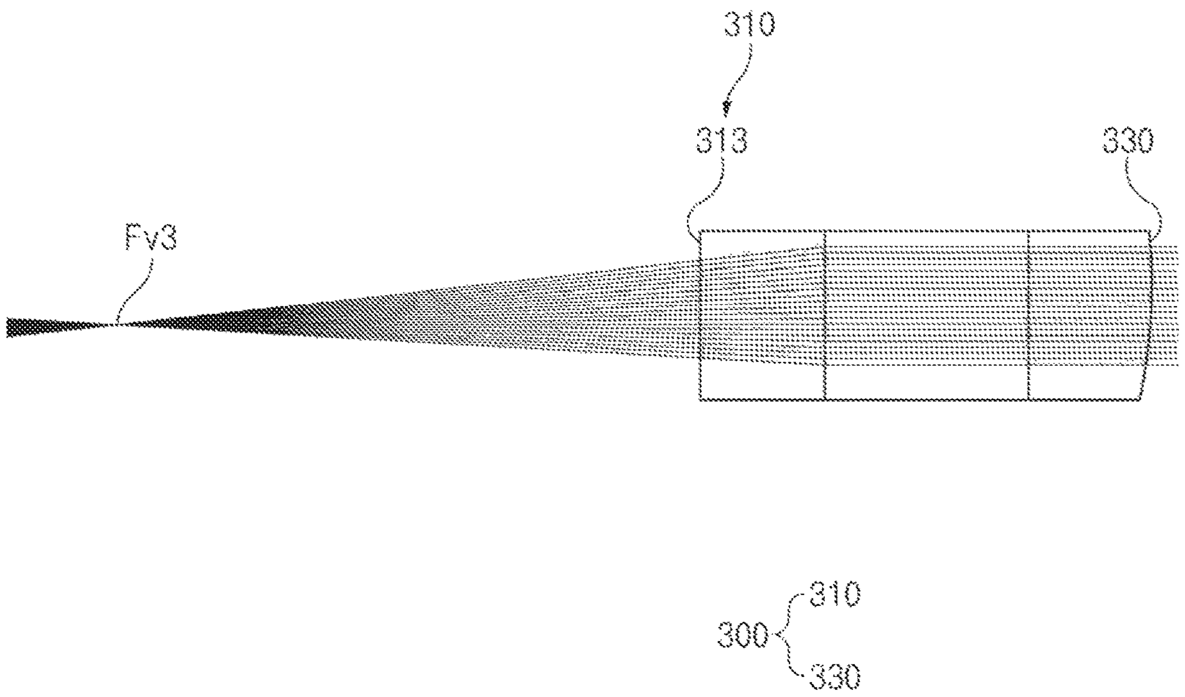
FIG. 6 is a view for describing the optical characteristics of the output lens part when a light path by the output lens part is viewed from the side.

FIG. 1 is a schematic top view illustrating a configuration of a vehicle lamp according to an embodiment of the present disclosure, FIG. 2 is a schematic view illustrating a configuration of a vehicle lamp according to the embodiment of the present disclosure when FIG. 1 is viewed from one side, FIG. 3 is an enlarged view of a first reflective module illustrated in FIG. 1, FIG. 4 is a vertical cross-sectional view of the first reflective module illustrated in FIG. 3, FIG. 5 is a view for describing optical characteristics of an output lens part when a light path by the output lens part is viewed from above, and FIG. 6 is a view for describing the optical characteristics of the output lens part when a light path by the output lens part is viewed from the side.

Referring to FIGS. 1 to 6, a vehicle lamp 10 according to an embodiment of the present disclosure includes a light source part (or light source) 100, an output lens part (or output lens) 300, and a reflective part 200. Hereinafter, a direction in which a light beam is output from the output lens part 300 is defined as an output direction D22, and a direction opposite to the output direction D22 is defined as a light source direction D21. Further, a direction perpendicular to the output direction D22 and parallel to the ground is defined as a left-right (or horizontal) direction D1, a direction that is perpendicular to the output direction D22 and faces the upper side is defined as an upward direction D31, and a direction opposite to the upward direction D31 is defined as a downward direction D32.

The light source part 100 includes a plurality of light sources 110, 120, and 130 that irradiate a light beam.

Various light emitting elements or devices may be used as the light sources. For example, the light source may be a light emitting diode (LED), but the present disclosure is not limited thereto, and various lamps such as a laser diode, a bulb, a halogen lamp, and a xenon lamp (high intensity discharge (HID) lamp) may be applied.

The light source part 100 may include the plurality of light sources 110, 120, and 130, and the number and arrangement of the light sources may be determined according to design specifications of the lamp. For example, the plurality of light sources 110, 120, and 130 may be arranged in the left-right direction D1 and classified into a plurality of groups. Here, the plurality of light sources 110, 120, and 130 may be lighted or lighted out according to the groups or individually. However, the arrangement of the plurality of light sources 110, 120, and 130 is not limited thereto.

The output lens part 300 may form a predetermined beam pattern by outputting the light beam irradiated from the light source part 100 in the output direction D22 that is a forward direction. Further, the output lens part 300 includes an input surface 310 into which the light beam irradiated from the light source part 100 is input and an output surface 330 from which the light beam passing through the input surface 310 is output.

To form the beam pattern, the reflective part 200 may reflect the light beam irradiated from the light source part 100 and input the reflected light beam into the input surface 310.

Here, the light beam emitted from the light source part 100 may be condensed by the reflective part 200 and input into the input surface 310.

Further, a light path of the light beam passing through the output lens part 300 in the left-right direction D1 is formed due to optical characteristics of the input surface 310, and a light path of the light beam passing through the output lens part 300 in the upward/downward (or vertical) direction D31 and D32 is formed due to optical characteristics of the output surface 330.

In detail, the output lens part 300 may be formed such that the optical characteristics of the input surface 310 and the optical characteristics of the output surface 330 are different from each other. Here, the optical characteristics may be, for example, a refractive index, an aspheric coefficient, and the like. The output lens part 300 according to the embodiment of the present disclosure has a structure in which a surface having optical characteristics for forming the light path of the output light beam in the left-right direction D1 and a surface having optical characteristics for forming the light path of the output light beam in the upward/downward direction D31 and D32 are separately formed on both surfaces of the output lens part 300, which are different from each other.

The light beam irradiated from the light source part 100 is reflected by the reflective part 200 and passes through the output lens part 300. The light beam may be input into the output lens part 300 through the input surface 310 and may be output toward a front side of the output lens part 300 through the output surface 330. The input surface 310 may have a shape of a refractive surface for forming the light path of the light beam in the left-right direction D1, and the output surface 330 may have a shape of a refractive surface for forming the light path of the light beam in the upward/downward direction D31 and D32.

The light beam emitted toward the front side of the output lens part 300 may sequentially pass through the input surface 310 and the output surface 330 to form the light path in the left-right direction D1 and the light path in the upward/downward directions D31 and D32.

Using the output lens part 300 according to the embodiment of the present disclosure, a remarkably slim design may be implemented while optical performance is satisfied. In detail, as compared to a case in which the refractive surface for forming the light path in the left-right direction D1 and the refractive surface for complexly forming the light path in the upward/downward direction D31 and D32 are simultaneously formed on the same surface or a case in which a lens having the refractive surface for forming the light path in the left-right direction D1 and a lens having the refractive surface in the upward/downward direction D31 and D32 are separately provided and spaced apart from each other, as in the present disclosure, when the refractive surfaces having different characteristics are formed on both surfaces of one lens, the height in the upward/downward direction D31 and D32 may be reduced, and at the same time, a thickness thereof may be remarkably slimmed.

Further, according to the embodiment of the present disclosure, a horizontal curved surface shape and a vertical curved surface shape of the lens for forming the beam pattern are distributed and formed on both surfaces of the lens, and thus productivity may be improved, and material costs may be reduced.

Meanwhile, the reflective part 200 may include a plurality of reflective modules spaced apart from each other in the left-right direction D1. Further, the plurality of reflective modules may include a plurality of reflective surfaces corresponding to the plurality of light sources 110, 120, and 130, respectively.

For example, a case in which three reflective modules are present is illustrated in FIG. 1. A first reflective module 210, a second reflective module 220, and a third reflective module 230 may be sequentially arranged in the left-right direction D1. The first reflective module 210, the second reflective module 220, and the third reflective module 230 may be spaced apart from each other. According to the present disclosure, a plurality of beam patterns arranged in the left-right direction D1 may be formed using the plurality of separated reflective modules 210, 220, and 230.

Further, for example, a reflective surface provided in the first reflective module 210 is referred to as a first reflective surface 211, and a light source that irradiates the first reflective surface 211 with a light beam is referred to as the first light source 110. Further, a reflective surface provided in the second reflective module 220 is referred to as a second reflective surface 221, and a light source that irradiates the second reflective surface 221 with a light beam is referred to as the second light source 120. Further, a reflective surface provided in the third reflective module 230 is referred to as a third reflective surface 231, and a light source that irradiates the third reflective surface 231 with a light beam is referred to as the third light source 130. Hereinafter, vertical cross-sectional characteristics and horizontal cross-sectional characteristics of the first reflective surface 211 will be described as an example. The vertical cross-sectional characteristics and the horizontal cross-sectional characteristics of the first reflective surface 211 are commonly applied to the second reflective surface 221 and the third reflective surface 231.

A vertical cross section of the first reflective surface 211 may be formed toward the output direction D22 in the downward direction D32 and may be formed in a concave curved surface toward the light source direction D21 opposite to the output direction D22.

In detail, the vertical cross section of the first reflective surface 211 may be formed in an arc shape that is concave in the light source direction D21. Further, the first reflective surface 211 may be formed toward the output direction D22 in the downward direction D32.

Further, a vertical focal point of the first reflective surface 211 may be positioned closer to the input surface 310 than a midpoint between the first reflective surface 211 and the input surface 310. In this way, since the vertical focal point is formed adjacent to the output lens part 300, most of the light beam totally reflected from the first reflective surface 211 may be input into the input surface 310.

Due to the shapes of the reflective surfaces 211, 221, and 231, the reflective part 200 may condense the light beam output from the light source part 100 by reflection and allow the light beam to face the output lens part 300. Accordingly, most of the light beam irradiated from the light source part and reflected by the reflective surface may be input into the input surface 310 of the output lens part 300.

Thus, when the reflective part 200 according to the present disclosure is used, light loss is minimized in which the light beam escapes to an upper side and a lower side of the output lens part 300, and thus light input efficiency may be improved.

Meanwhile, referring to FIGS. 1 and 3, a horizontal cross section of the reflective surface may be formed in a parabolic shape that is convex in the light source direction D21 opposite to the output direction D22.

Due to the shape of this reflective surface, the reflective part 200 may condense the light beam output from the light source part 100 and then face the input surface 310 of the output lens part 300. Accordingly, loss of the light beam irradiated from the light source part 100 and reflected by the reflective surface at an end of the output lens part 300 in the left-right direction D1 may be minimized.

Meanwhile, the beam patterns formed by the plurality of light sources 110, 120, and 130 may individually have light distribution characteristics such as a size and a position. This may be implemented by a difference between curvatures of the plurality of reflective surfaces 211, 221, and 231 on a horizontal cross section.

In detail, the curvatures of the reflective surfaces included in the different reflective modules on the horizontal cross section may be different from each other. For example, in the illustrated embodiment, a horizontal curvature of the reflective surface provided in the first reflective module 210 and a horizontal curvature of the reflective surface provided in the second reflective module 220 may be different from each other.

Alternatively, the curvatures of the plurality of reflective surfaces 211, 221, and 231 on the horizontal cross section may be different from each other. For example, in the illustrated embodiment, the horizontal curvatures of the 12 reflective surfaces provided in the reflective part 200 may be different from each other.

When the horizontal curvatures of the reflective surfaces are different from each other, the light beams reflected by the respective reflective surfaces and passing through the output lens part 300 may have different orientation angles. Accordingly, the plurality of beam patterns formed by the light sources may have different light distribution characteristics such as different sizes and positions.

Thus, when an intelligent head lamp in which individual beam patterns are gathered to form a high beam pattern is implemented using the vehicle lamp 10 according to the embodiment of the present disclosure, individual beam patterns having required shapes may be easily implemented. Here, the intelligent head lamp may be an adaptive driving beam (ADB) lamp or an intelligent front-lighting system (IFS) that prevents glare to a driver of a preceding vehicle.

In this way, in the embodiment of the present disclosure, the vehicle lamp 10 may be implemented which improves light input efficiency to the output lens part 300, and at the same time, satisfies an intended individual orientation angle in the horizontal direction using the reflective surfaces having the characteristics in the left-right direction D1 and the characteristics in the upward/downward direction D31 and D32, which are different from each other.

Meanwhile, hereinafter, the input surface 310 and the output surface 330 of the output lens part 300 according to the embodiment of the present disclosure will be described with reference to FIGS. 1, 2, 5, and 6.

The input surface 310 may include a plurality of unit light input surfaces 311, 312, and 313 arranged in the left-right direction D1 and provided to correspond to the plurality of reflective modules. Here, the plurality of unit light input surfaces 311, 312, and 313 may be continuously formed on the input surface 310 of the output lens part 300.

For example, an example in which the input surface 310 includes three unit light input surfaces, that is, the first light input surface 311, the second light input surface 312, and the third light input surface 313 is illustrated in the illustrated embodiment. However, the number of unit light input surfaces according to the present disclosure is not limited to the illustrated embodiment and may be two or four or more.

The plurality of unit light input surfaces may be arranged to correspond to traveling paths of the light beams reflected by the plurality of reflective modules, respectively.

For example, in the illustrated embodiment, the first light input surface 311 may correspond to the first reflective module 210, the second light input surface 312 may correspond to the second reflective module 220, and the third light input surface 313 may correspond to the third reflective module 230.

The horizontal cross section of the unit light input surface may be formed in a convex curved surface shape toward the light source direction D21 that is opposite to the output direction D22 and may be formed toward the output direction D22 as it goes to an end thereof in the left-right direction D1. The light path of the light beam output through the output lens part 300 in the left-right direction D1 may be formed by the horizontal cross section of the unit light input surface. Thus, the optical characteristics, such as a refractive index and an aspheric coefficient, of the unit light input surfaces are made different, and thus the beam patterns generated by the light beams passing through the unit light input surfaces may be made different.

A vertical cross section of the unit light input surface may be formed to be almost flat as a curved surface having an extremely small curvature is formed.

Referring to the illustrated embodiment, unlike the input surface 310, the output surface 330 according to the embodiment of the present disclosure is not divided into a plurality of areas and may be continuously formed. In detail, the output surface 330 may be continuously formed in the left-right direction D1 and may be formed in an area corresponding to an area including the plurality of unit light input surfaces.

Referring to FIGS. 1 and 5, a horizontal cross section of the output surface 330 may be formed in a convex shape in the output direction D22 and may be formed toward the light source direction D21 as it goes to one end thereof in the left-right direction D1.

Further, the vertical cross section of the output lens part 300 may be formed in a convex shape in the output direction D22. For example, the curvature of the output surface 330 in the vertical direction may be smaller than the curvature of the output surface 330 in the left-right direction D1. A vertical angle and a light width of the light beam traveling in the output direction D22 may be adjusted by the shape of the output surface 330.

FIGS. 5 and 6 are views illustrating the light path by the output lens part 300 and for describing the optical characteristics of the output lens part 300.

For example, horizontal focal points FH1, FH2, and FH3 and a vertical focal point FV3 by the output lens part 300 may be formed in each unit light input surface. The light path of the light beam output to the outside of the output surface 330 in the left-right direction D1 may be formed by the shape of the input surface 310 of the output lens part 300. The light path of the light beam output to the outside of the output surface 330 in the upward/downward direction D31 and D32 may be formed by the shape of the output surface 330 of the output lens part 300.

According to the embodiment of the present disclosure, the light loss is minimized, and thus the slim design may be implemented while optical performance is satisfied. Further, in the embodiment of the present disclosure, a horizontal curved surface shape and a vertical curved surface shape of the lens for forming the beam pattern are distributed and formed on both surfaces of the lens, and thus the productivity may be improved, and the material costs may be reduced.

According to an embodiment of the present disclosure, light loss is minimized, and thus a slim design may be implemented while optical performance is satisfied.

According to the embodiment of the present disclosure, a horizontal curved surface shape and a vertical curved surface shape of the lens for forming a beam pattern are distributed and formed on both surfaces of the lens, and thus productivity may be improved, and material costs may be reduced.

Although specific embodiments of the present disclosure have been described above, the spirit and scope of the present disclosure are not limited thereto, and those skilled in the art to which the present disclosure pertains may derive various modifications and changes without changing the subject matter of the present disclosure described in the appended claims.

What is claimed is:

1. A vehicle lamp comprising:

a plurality of light source groups, each light source group including a plurality of light sources configured to irradiate a light beam;

an output lens having (1) an input surface configured to receive the light beam irradiated from the plurality of light sources of the plurality of light source groups and (2) an output surface configured to output the received light beam in a first direction from the input surface to the output surface of the output lens; and a plurality of reflective modules respectively corresponding to the plurality of light source groups and spaced apart from each other in a horizontal direction, each reflective module including a plurality of reflective surfaces respectively corresponding to the plurality of light sources of the corresponding light source group and adjoining each other side-by-side, wherein the input surface of the output lens includes a plurality of unit light input surfaces respectively corresponding to the plurality of reflective modules and arranged in the horizontal direction, each unit light input surface being horizontally convex, wherein each reflective module is configured to reflect, toward the corresponding unit light input surface, the light beam irradicated from the plurality of light sources of the corresponding light source group, wherein the input surface of the output lens has first optical characteristics causing a first light path of the light beam to be formed through the output lens in the horizontal direction, and the output surface of the output lens has second optical characteristics causing a second light path of the light beam to be formed through the output lens in a vertical direction, and wherein the output surface of the output lens is horizontally curved in a convex shape continuously extending from a first horizontal end to a second horizontal end of the output lens.

2. The vehicle lamp of claim 1, wherein each reflective surface is vertically concave.

3. The vehicle lamp of claim 1, wherein each reflective surface has a vertical focal point positioned closer to the input surface than to a midpoint between the reflective surface and the input surface.

4. The vehicle lamp of claim 1, wherein each reflective surface has a horizontally convex parabolic shape.

5. The vehicle lamp of claim 4, wherein curvatures of the plurality of reflective surfaces respectively included in different reflective modules are mutually different from each other.

6. The vehicle lamp of claim 4, wherein curvatures of the plurality of reflective surfaces in a same reflective module are mutually different from each other.

7. The vehicle lamp of claim 1, wherein each of the plurality of unit light input surfaces is arranged to correspond to a traveling path of the light beams reflected by the corresponding reflective module.

8. The vehicle lamp of claim 1, wherein the output surface of the output lens is vertically convex.

9. The vehicle lamp of claim 1, wherein:

the plurality of light source groups includes first, second and third light source groups, the plurality of reflective modules includes first, second and third reflective modules respectively corresponding to the first, second and third light source groups, and the plurality of unit light input surfaces including first, second and third unit light input surfaces respectively corresponding to the first, second and third reflective modules.

10. The vehicle lamp of claim 9, wherein a first distance between the first unit light input surface and the first light source group, a second distance between the second unit light input surface and the second light source group, and a third distance between the third unit light input surface and the third light source group are different from each other.

* * * * *